UNITED STATES PATENT OFFICE.

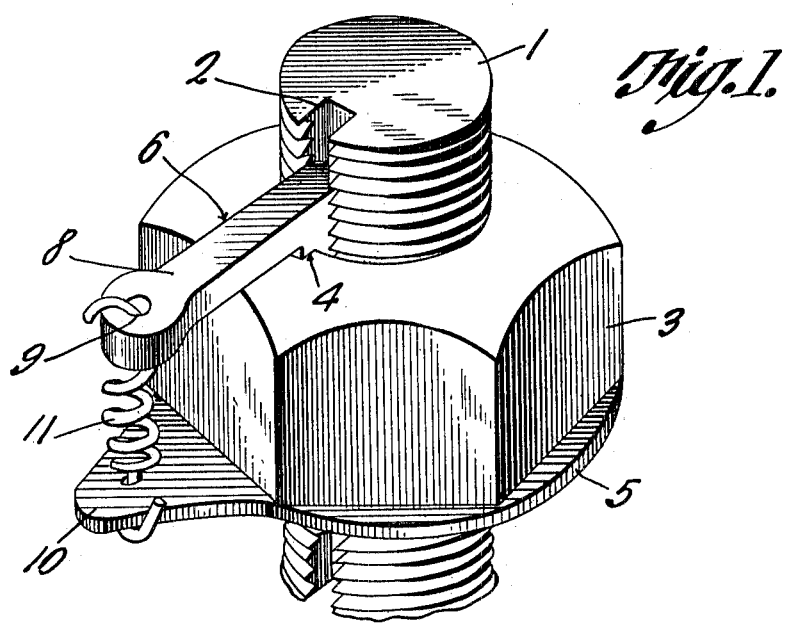
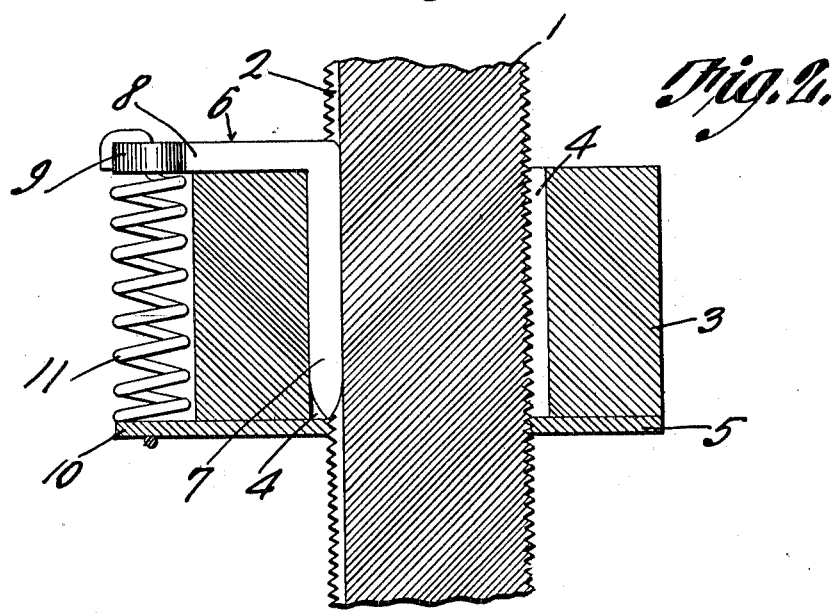

JAMES W. S. BARGER, OF EDDYVILLE, ILLINOIS.

NUT-LOCK.

1,105,742. Specification of Letters Patent. Patented Aug. 4, 1914.

Application filed March 7, 1914. Serial No. 823,239.

*To all whom it may concern:*

Be it known that I, JAMES W. S. BARGER, a citizen of the United States, residing at Eddyville, in the county of Pope and State of Illinois, have invented a new and useful Nut-Lock, of which the following is a specification.

The present invention appertains to nut locks, and aims to provide a novel and improved device for locking a nut upon a bolt in a simple and effective manner.

It is the object of the present invention to provide a nut lock of simple and inexpensive construction, which may readily be applied to various nuts and bolts, and which will effectively serve its purposes as well as being simple, convenient, practical and serviceable in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a perspective view of the improved device as applied to a nut and bolt. Fig. 2 is a longitudinal sectional view thereof.

In the drawings, the numeral 1 designates a bolt, which is provided with a longitudinal groove or keyway 2, and the numeral 3 designates the nut threaded on the bolt, and provided with one or more inner longitudinal grooves or keyways 4 adapted to register or coincide with the groove 2 of the bolt 1, as the nut is rotated or threaded upon the bolt.

The numeral 5 designates the washer loosely mounted upon the bolt, at the back or inner face of the nut 3.

In carrying out the present invention, there is provided an angular or L-shaped key member 6, one arm 7 of which forms the key proper. The arm or key 7 is of square or rectangular cross section, and preferably has its free end sharpened or pointed, in order that the key may be readily wedged between the registering grooves 2 and 4 of the bolt and nut, respectively. The other or outer arm 8 of the key element 6 is adapted to rest or seat against the outer face of the nut, and is provided at its free end, beyond the periphery or margin of the nut, with an eye 9.

The washer 5 is provided, at one side, with a radial projection or ear 10, which is apertured, in order that the aperture of the ear or lobe may aline with the eye 9 of the key element. A coiled wire retractile spring 11 has its ends engaged through the apertured ear 10 and the eye 9 of the washer and key element, respectively, for retaining the key 7 in engagement with the nut and bolt.

In use, the washer 5 and nut 3 may be applied upon the bolt, in the usual manner, and after the nut has been threaded to the position desired, one of the nut grooves 4 registering with the bolt groove 2, the key 7 may readily be inserted into the registering grooves 2 and 4, so as to lock the nut against rotation. The retaining arm 8 of the key element seats against the outer face of the nut, and the spring 11 connecting the arm 8 and the ear or lobe of the washer 5, will maintain the key element in engagement with the nut and bolt, it being observed, however, that the key element is yieldingly held in place, in order that it may be retracted out of engagement with the nut and bolt, by pulling the key element outwardly against the tension of the spring 11. It will thus be obvious that the spring 11 permits the key element to be readily engaged with the nut and bolt, and also enables the key element to be withdrawn, without detaching the key element from the washer 5.

From the foregoing, the advantages and capabilities of the present device will be obvious without further comment, it being noted that the objects aimed at have been carried out satisfactorily.

Having thus described the invention, what is claimed as new is:—

1. The combination with a longitudinally grooved bolt and a nut threaded on the bolt and having a longitudinal groove adapted to register with the bolt groove, of a washer mounted on the bolt adjacent one face of the nut, an angular key element, one arm of the key element forming a key engageable with the registering grooves of the nut and bolt, the other arm of the key element seating against the other face of the nut, and means connecting the last mentioned arm of the key element and the washer for retaining the key in engagement with the nut and bolt grooves.

2. The combination with a longitudinally grooved bolt and a nut threaded on the bolt and having a longitudinal groove adapted to register with the bolt groove, of a washer mounted on the bolt adjacent one face of the nut, an angular key element, one arm of the key element forming a key engageable with the registering grooves of the nut and bolt, the other arm of the key element seating against the other face of the nut, and yieldable means connecting the last mentioned arm of the key element and the washer.

3. The combination with a longitudinally grooved bolt, and a nut threaded on the bolt and having a longitudinal groove adapted to register with the bolt groove, of a washer mounted on the bolt adjacent one face of the nut and having a radial apertured lobe, an angular key element having one arm in the form of a key engageable with the registering grooves of the bolt and nut, the other arm of the key element being seatable against the other face of the nut and having an eye at its free end, and a coiled wire spring having its ends engaged through the said eye and apertured lobe.

In testimony that I claim the foregoing as my own, I have hereto affixed my signature in the presence of two witnesses.

JAMES W. S. BARGER.

Witnesses:
T. J. PALMER,
HARCE MAXWELL.

Copies of this patent may be obtained for five cents each, by addressing the "Commissioner of Patents, Washington, D. C."